United States Patent [19]

Göb

[11] Patent Number: 4,706,792

[45] Date of Patent: Nov. 17, 1987

[54] FLUID FRICTION CLUTCH

[75] Inventor: Werner Göb, Kürnach, Fed. Rep. of Germany

[73] Assignee: Fichtel & Sachs AG

[21] Appl. No.: 789,622

[22] Filed: Oct. 21, 1985

[30] Foreign Application Priority Data

Oct. 20, 1984 [DE] Fed. Rep. of Germany ....... 3438533
Nov. 17, 1984 [DE] Fed. Rep. of Germany ....... 3442103

[51] Int. Cl.$^4$ ............................................ F16D 31/00
[52] U.S. Cl. .................................. 192/58 B; 192/82 T
[58] Field of Search ............................ 192/58 B, 82 T

[56]  References Cited

U.S. PATENT DOCUMENTS 4,054,193  5/1976  Streeter .
4,090,596  1/1977  Blair .
4,380,279  12/1980  Masai .
4,505,367  3/1985  Martin .............................. 192/58 B

FOREIGN PATENT DOCUMENTS 7901124  12/1979  European Pat. Off. .
0008889  3/1980   European Pat. Off. .
0106581  4/1984   European Pat. Off. .
3103064  8/1982   Fed. Rep. of Germany .
3149104  6/1983   Fed. Rep. of Germany .
1540708  2/1979   United Kingdom .
1556142  11/1979  United Kingdom .

Primary Examiner—Carl D. Friedman
Attorney, Agent, or Firm—Toren, McGeady & Associates

[57] ABSTRACT

The fluid friction clutch, especially fan clutch, comprises for the temperature-dependent controlling of its shear fluid cycle a bimetallic element (35) which is to be displaced in its longitudinal direction for installation in a retaining fitting (37). A clip (63) fitted on to the retaining fitting (37) after the installation of the bimetallic element (35) blocks the path of introduction of the bimetallic element (35) and thus secures the bimetallic element (35) against unintentional release out of the retaining fitting (37).

12 Claims, 12 Drawing Figures

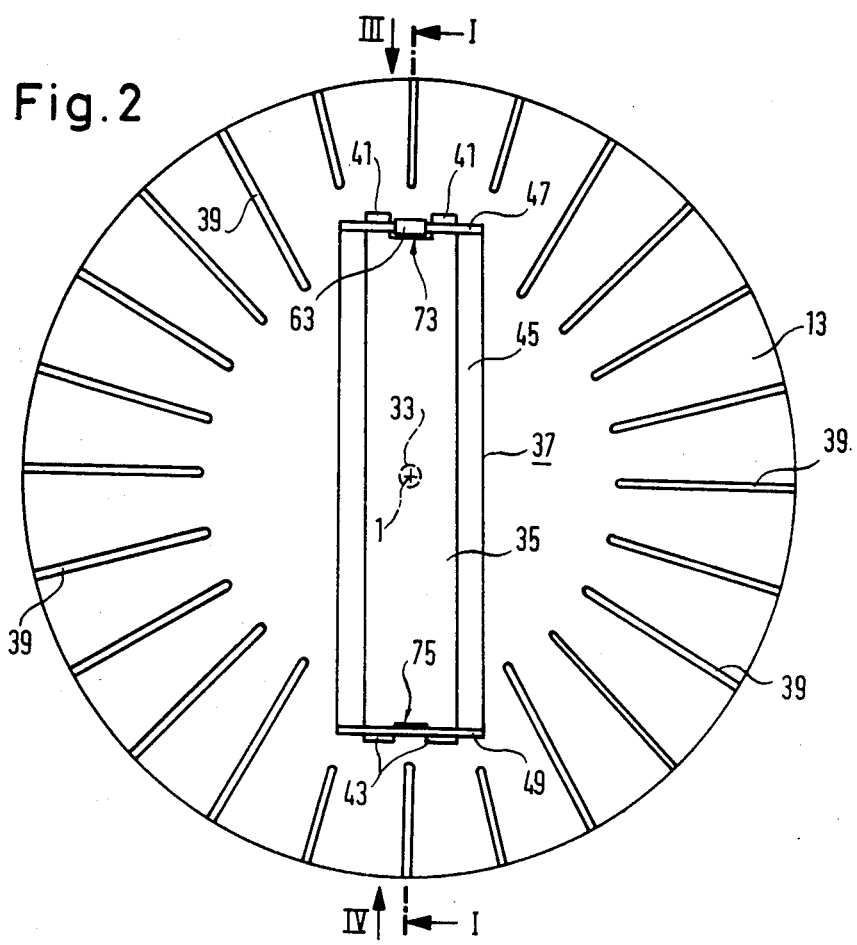
Fig. 2
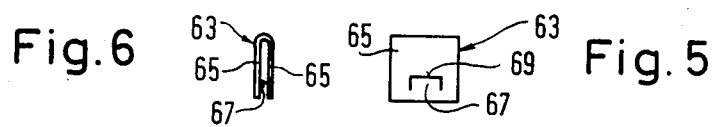
Fig. 6  Fig. 5
Fig. 3
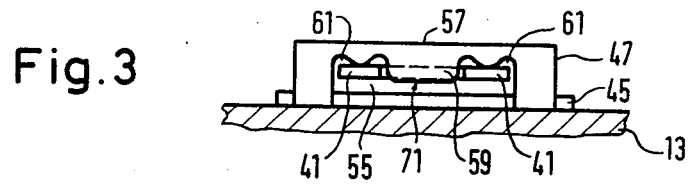
Fig. 4
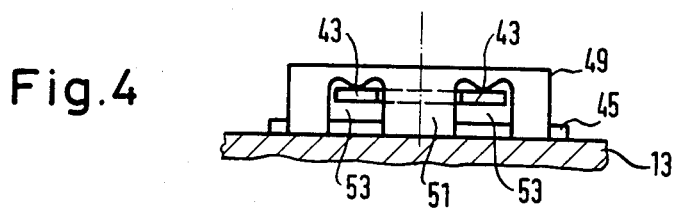

FLUID FRICTION CLUTCH

BACKGROUND OF THE INVENTION

The invention relates to a fluid friction clutch, especially for a cooling fan of a fluid-cooled internal combustion engine.

A fluid friction clutch for the cooling fan of a fluid-cooled internal combustion engine is known from Fed. German Publ. Spec. No. 3,103,064, of which the housing provided with fan blades is mounted rotatably on a drive shaft driven by the internal combustion engine. The housing contains a reservoir for shear fluid and a working chamber. A rotor held on the drive shaft is arranged in the working chamber and together with the working chamber defines at least one shear gap. A valve device temperature-dependently controls the cycling of shear fluid between the working chamber and the reservoir, so that the clutch may be engaged and disengagend temperature-dependently. A substantially elongated bimetallic element, which controls the valve through an axially displaceable pin, is secured on an axial end face of the housing, in a retaining fitting. In the region of the mutually opposite ends or short sides of the bimetallic element the retaining fitting has stop faces which fix the ends both in the circumferential direction of the housing and axially and radially of the axis of rotation. In the known clutch two tongues are provided with spacing from one another on each of the short sides of the bimetallic element, and engage in axial leg parts of the substantially U-shaped retaining fitting. Between the tongues the leg parts carry tabs which fix the bimetallic element in its longitudinal direction between them. The tab of one of the two leg parts is adjoined by an opening which is of such large dimensions that the entire cross-section of the bimetallic element can be inserted. For the fitting of the bimetallic element the latter is firstly introduced into this opening, whereafter the two tongues are inserted at the opposite end into the associated apertures of the other leg part of the retaining fitting. In this action the bimetallic element is shifted towards the other leg part until the two tongues on the first-mentioned end snap into the allocated apertures of the leg part. The bimetallic element is held by its own stress in the apertures of the leg part of the retaining fitting and bears in its middle region on the pin of the valve device.

It is further known to hold the bimetallic element in apertures of radially extending cooling fins of the clutch housing by inherent stress.

In known fluid friction clutches the bimetallic element is held exclusively by its own stress. For example in repair work the bimetallic element can unintentionally be disengaged from its retention, which leads to failure of the temperature control of the clutch.

It is the problem of the invention to improve a fluid friction clutch, especially for the cooling fan of a fluid cooled internal combustion engine, so that unintentional disengagement of the bimetallic element is reliably prevented in a constructionally simple manner.

SUMMARY OF THE INVENTION

According to the invention the bimetallic element is fixed on the housing, at least in the direction of the axis of rotation, by the stop faces of the retaining fitting. However the fixing in the longitudinal direction of the bimetallic element is not effected as in conventional clutches exclusively by snapping in between radial stop faces of the retaining fitting by reason of the inherent stress of the bimetallic element, but in addition a preferably resilient clip is provided which is inserted in the longitudinal direction between the bimetallic element and a stop shoulder of the retaining fitting which points towards the bimetallic element. The clip limits the displacement distance in the longitudinal direction necessary for the release of the bimetallic element. The clip is expediently pushed on to the leg parts of the retaining fitting or the housing fins axially so that the improvement can also be used in conventional fan clutches without substantial modification of the construction. The clip can be used for the fixing of the bimetallic element not only in its longitudinal direction but also in the circumferential direction of the housing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 2 shows a plan view of a part of the housing of the fan clutch, seen in the direction of an arrow II in FIG. 1;

FIG. 3 shows a side view of a retaining fitting of a bimetallic element of the fan clutch, seen in the direction of an arrow III in FIG. 2;

FIG. 4 shows another lateral view of a bimetallic element retaining fitting of the fan clutch, seen in the direction of the arrow IV in FIG. 2;

FIG. 5 shows a front view of a clip used in connection with the bimetallic element retaining fitting;

FIG. 6 shows a side view of the clip;

DETAIL DESCRIPTION OF THE DRAWINGS

Figure 1:
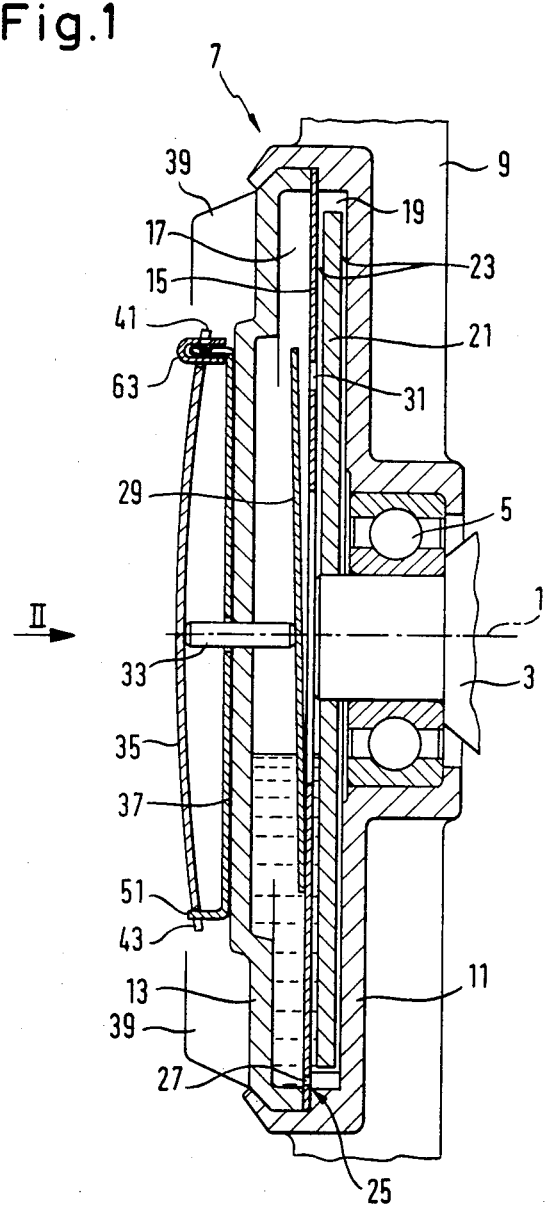
FIG. 1 shows an axial longitudinal section through a fan clutch for a fluid-cooled internal combustion engine, seen along a line I—I in FIG. 2.

FIG. 1 shows a fan clutch, formed as fluid friction clutch, for a fluid-cooled internal combustion engine (not illustrated further). A housing, designated as a whole by 7, is coaxially rotatably mounted through a ball bearing 5 on a drive shaft 3 driven in rotation about a rotation axis 1 by the internal combustion engine. The housing 7 comprises a pot part 11 provided with a plurality of radially protruding fan blades 9 and tightly closed by a lid part 13 for the accommodation of shear fluid. A partition 15 divides the housing 7 into a reservoir 17 for the shear fluid and a working chamber 19. In the working chamber 19 there is arranged a rotor 21 of disc form for example, seated fast on the drive shaft 3. The axial faces of the rotor 21 together with opposite faces of the partition 15 and of the pot part 11 form shear gaps 23 for the torque transmission through the shear fluid.

The fan clutch is temperature-dependently engageable and disengageable and for this purpose comprises in the region of the external circumference of the rotor 21 a pump device 25 which pumps the shear fluid, for the disengagement of the clutch, through an opening 27 in the partition 15 out of the working chamber 19 and the shear gaps 23 into the reservoir 17. The inflow of shear fluid from the reservoir 17 into the working chamber 19 is controlled by a valve blade 29 secured on the partition 15, which opens and closes a further opening 31 in the partition. The valve blade 29 is resiliently stressed into the open position and is actuated through a pin 33 axially displaceable in the lid part 13 by a bimetallic element 25 which is secured in a retaining fitting 37 on the outer side of the lid part 13 lying forward in the driving direction. In the cold condition the bimetallic element 35 closes the opening 31 by means of the pin 33 and the valve blade 29, whereby the pump device 25 pumps the shear fluid away out of the shear gaps 23 and interrupts the torque transmission from the rotor 21 to the housing 7. In the hot operating condition the bimetallic element 35 opens the opening 31, so that the shear gaps 23 can fill with shear fluid, despite the pump action of the pump device 25, and the fan blades 9 are driven from the drive shaft 3.

It should further be mentioned that several radially extending cooling fins 39 arranged in distribution in the circumferential direction protrude axially outwards from the lid part 13.

FIGS. 2 to 6 show details of the securing of the bimetallic element 35 on the lid part 13. The bimetallic element 35 has a substantially elongated, rectangular form and is arranged centrally in relation to the rotation axis 1. In the region of each of the short sides or ends of the bimetallic element 35 there are provided two tongues 41 and 43 respectively, protruding in its longitudinal direction. The tongues 41, 43 are arranged with spacing from one another transversely of the longitudinal direction. The retaining fitting 37 has the form of a flat, substantially U-shaped shackle with an elongated base part 45 secured to the lid part 13, from the short sides of which leg parts 47, 49 are bent off axially and parallel to one another. The leg part 49 has two openings 53 separated from one another by an intermediate piece 51, in which openings the tongues 43 engage. The intermediate piece 51 extends over the entire axial height of the leg part 49 and engages between the two tongues 43. The leg part 47 forms, axially close to the base part 45, an insertion opening 55 into which the bimetallic element 35 is insertable with its entire short side cross-section. From the intermediate piece 57 of the leg part 47, which defines the insertion opening on the side remote from the lid part 13, a tab 59 protrudes which separates from one another two apertures 61 merging into the insertion opening 55, for the reception of the tongues 41. The tab 59 extends between the two tongues 41.

For the fitting of the bimetallic element 35 to the retaining fitting 37 the bimetallic element 35 is introduced into the insertion opening 55 and pushed with the tongues 43 foremost into the apertures 53. The bimetallic element 35 bears by reason of its own stress on the pin 33 on one side and on the abutment edges of the apertures 53, 61 for the other part.

A resilient, substantially U-shaped clip 63 is fitted axially on to the intermediate piece 57 of the leg part 47. The clip 63 is arranged between the tongues 41 and extends with its legs 65 into the insertion opening 55 of the leg part 47. The clip 63 blocks the insertion opening 55, so that when the clip 63 is fitted on, the bimetallic element 35 cannot be displaced, with its tongues 41 foremost into the insertion opening 55 into a position in which the tongues 43 snap out of the apertures 53.

Out of one of the legs 65 of the clip 63 a spring tab 67 is punched free which, when the clip 63 is fitted, abuts with a blocking edge 69 pointing towards the leg foot of the clip 63, on the edge 71 of the tab 59 pointing towards the insertion opening 55, and secures the clip 63 against pulling away.

In the installed condition the bimetallic element 35 is fixed in its longitudinal direction with its short side edges 73 and 75 placed between the tongues 41 for one part and 43 for the other. In the axial direction of the housing 7 the bimetallic element 35 is fixed by the tongues 43 and 41 respectively, supported in the apertures 51, 61, which tongues also secure the bimetallic element 35 in the circumferential direction of the housing.

The clip 63 in a simple manner achieves the object that the bimetallic element 35 cannot be loosened out of the retaining fitting 37 by unintentional depression and displacement.

Variants are to be explained below for the securing of a bimetallic element controlling the fan clutch, which differ from the form of embodiment according to FIGS. 1 to 6 essentially in that the radial cooling fins provided on the lid part are utilized for securing. Parts of like effect are provided with the same reference numerals and for distinction with an additional letter. For more detailed explanation reference is made to the description of FIGS. 1 to 6.

Figure 7:
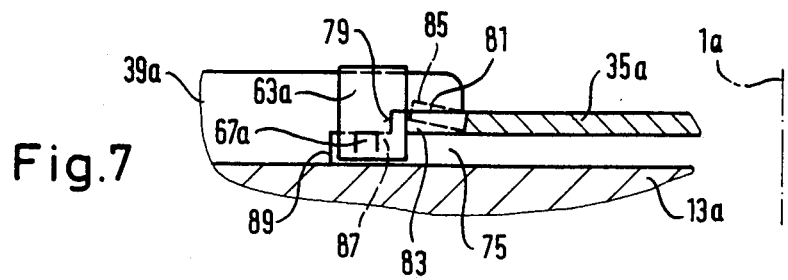
FIG. 7 shows a partial axial longitudinal section through a variant of a bimetallic element retaining fitting usable with the fan clutch according to FIG. 1, seen along a line VII—VII in FIG. 8.
Figure 8:
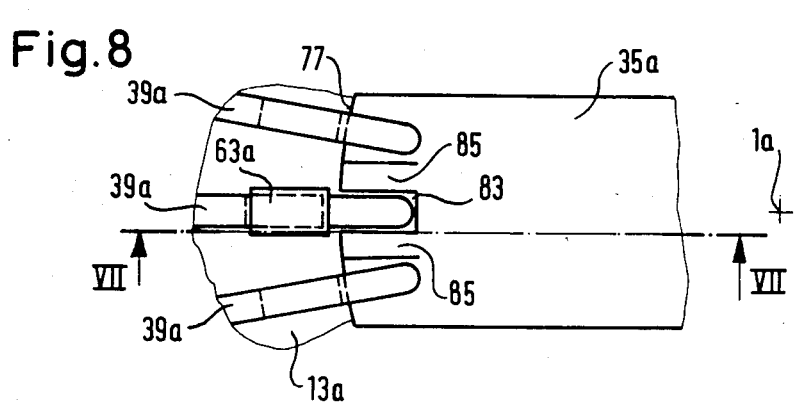
FIG. 8 shows a partial axial plan view of the bimetallic element retaining fitting according to FIG. 7.

In FIGS. 7 and 8 the cooling fins 39a are provided at their radially inner ends with a stepped aperture 75, by undercutting concentric with the rotation axis 1a. The bimetallic element 35a has short sides 77 circularly curved concentrically with the rotation axis 1a which engage centrally of the rotation axis 1a in the apertures 75 each of several diametrically opposite cooling fins 39a. The radially inner ends of the cooling fins 39a overlap the ends of the bimetallic element 35a. The radial depth of the apertures 75 is made at least twice as great as the length of the overlap of the radially inner ends of the cooling fins 39a and of the ends of the bimetallic element 35a. In this way the bimetallic element can be introduced with its one end into the apertures 75 and can be introduced, against its own stress, with its other end into the apertures 75 of the diametrically opposite cooling fins 39a.

The apertures 75 widen, forming a radially inwardly pointing shoulder 79, towards the bimetallic element 35a. The stop shoulder 79 here protrudes from an axial abutment face 81 on the side of the aperture 75 axially remote from the lid part 13a, axially towards the lid part 13a. The faces 81, 79 fix the bimetallic element 35a in its longitudinal direction and in the axial direction of the lid part 13a.

For the fixing of the bimetallic element 35 in the circumferential direction of the lid part 13a in the region of each of the two ends of the bimetallic element 35a, there is provided an aperture 83 into which the radially inner end of one of the cooling fins 39a reaches. On both sides of this cooling fin 39a in the circumferential direction, tabs 85 are punched free which are bent away from the lid part 13a. The tabs 85 enclose between them the cooling fin 39a engaging in the aperture 83.

On to the cooling fin 39a extending into the aperture 83, here the central one in each case of three adjacent cooling fins, there is fitted a spring clip 63a which abuts with its spring tongue 67a on an undercut face 87, radially externally adjoining the shoulder 79, of the aperture of this cooling fin for securing. The external dimensions of the clip 63a in the circumferential direction of the lid part 13a are larger than the dimensions of the apertures 83 of the bimetallic element 35a. Since the spring tongue 67a abuts on a radially outer end wall 89, possibly after taking up an idle distance, the bimetallic element 35a also cannot be shifted under the shoulder 79 towards the end wall 89 against its own stress. Unintentional unlocking of the bimetallic element 35a is therefore not possible.

By reason of the symmetrical configuration of the bimetallic element 35a and the apertures 75 produced by relieving, clips 63a are necessary at both ends of the bimetallic element 35a.

Figure 9:
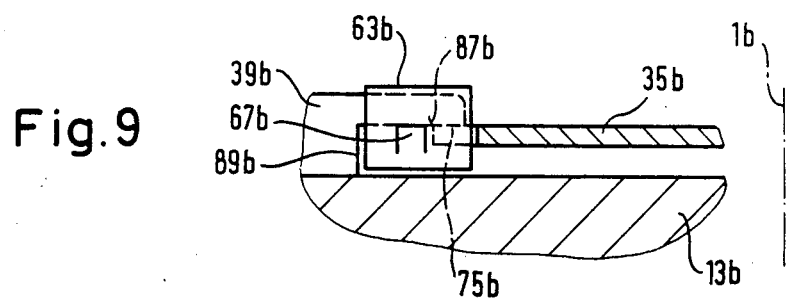
FIG. 9 shows a partial axial longitudinal section through another variant of a bimetallic element retaining fitting usable with the fan clutch according to FIG. 1, seen along a line IX—IX in FIG. 10.
Figure 10:
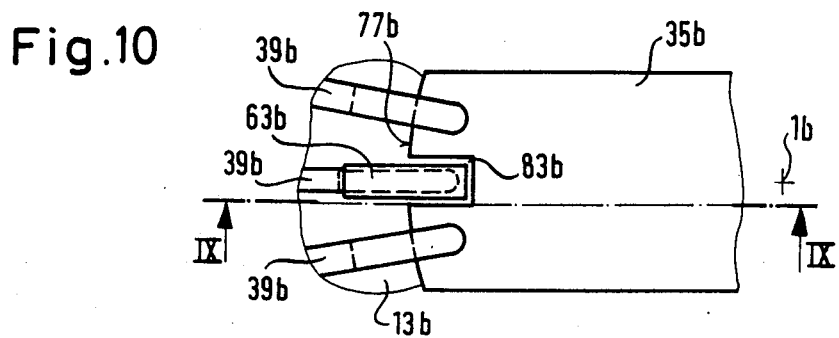
FIG. 10 shows a partial axial view of the bimetallic element fitting according to FIG. 9.

The embodiment according to FIGS. 9 and 10 differs from the securing of the bimetallic element according to FIGS. 7 and 8 essentially only in the configuration of the apertures 75b formed by relieving of cooling fins 39b. Therefore for explanation reference is also made to the description of FIGS. 7 and 8.

The apertures 75b at the radially inner ends of the cooling fins 39b extend steplessly in the radial direction as far as a radially outwardly placed, radially inwardly facing end wall 89b. The apertures 83b at the two ends of the bimetallic element 35b are wider in the circumferential direction of the lid part 13b than the clip 63b. The clip 63b extends radially into the aperture 83b and overlaps the bimetallic element 35b in the axial direction. Thus the bimetallic element 35b is fixed in the circumferential direction by means of the clip 63b. The spring tongue 67b is again fixed on the undercut face 87b of the aperture 75b and limits the path of displacement of the bimetallic element 35b in the longitudinal direction. The dimensions of the clip 63b and of the apertures 75b are so selected that the bimetallic element 35b can be installed and removed only with the clip 63b removed.

Figure 11:
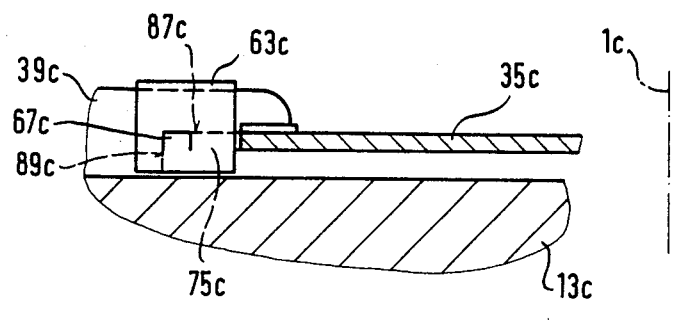
FIG. 11 shows a partial axial longitudinal section through a further variant of a bimetallic element retaining fitting usable in the fan clutch according to FIG. 1, seen a XI—XI in FIG. 12.
Figure 12:
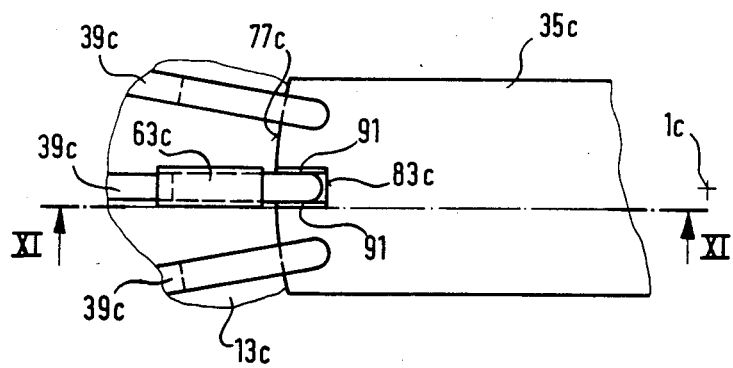
FIG. 12 shows a partial axial view of the bimetallic element retaining fitting according to FIG. 11.

FIGS. 11 and 12 show a variant for a bimetallic element fastening which differs from the form of embodiment according to FIGS. 9 and 10 only in that the clip 63c, similarly to the form of embodiment of FIGS. 7 and 8, does not engage in the aperture 83c, but terminates radially outside the circularly curved short sides 77c of the bimetallic element 35c. For the guidance of the bimetallic element 35c in the circumferential direction of the lid part 13c tabs 91 are bent out of the aperture 83c which extend parallel with one another and enclose between them the radially inner ends of the cooling fins 39c which in axial projection overlap with the aperture 83c. The spring tongue 67c is so arranged that it abuts on the undercut face 87c of the aperture 75c and secures the clip 63c against withdrawal. The distance of the tabs 91 from one another in the circumferential direction is less than the external width of the clip 63c. The dimensions of the clip 63c are so selected that the bimetallic element 35c cannot be removed by displacement in its longitudinal direction when the clip 63c is pushed on to the cooling fin 39c. The spring tongue 67c here lies against the end face 89c of the aperture 75c.

In the embodiments as explained above the clip is secured in each case by shape engagement of its spring tongue on the retaining fitting or the cooling fins. However the clip can also be secured by a clamping seating. The primary essential is that the opening cross-section necessary for the installation of the bimetallic element is blocked by the clip, for the securing of the bimetallic element.

While specific embodiments of the invention have been shown and described in detail to illustrate the application of the inventive principles, it will be understood that the invention may be embodied otherwise without departing from such principles.

What I claim is:

1. A fluid friction clutch, especially for a cooling fan of a fluid-cooled internal combustion engine, comprising:
   (a) a rotor drivable in rotation about a rotation axis,
   (b) a housing rotatable in relation to the rotor and enclosing a reservoir and a working chamber, said rotor being arranged in the working chamber and defining at least one shear gap with the working chamber,
   (c) a valve device for the control of a flow cycle of shear fluid between the reservoir and the working chamber,
   (d) a substantially elongated rectilinearly extending bimetallic element secured on an axial end face of the housing in a retaining fitting for the temperature-dependent control of the valve device, said retaining fitting having, in the region of the ends of the bimetallic element opposite to one another in the elongated direction of said bimetallic element, stop faces which fix said ends both in the circumferential direction of the housing and axially and radially of the rotation axis, said retaining fitting having an insertion opening therein through which said bimetallic element is displaceable in the elongated direction thereof, and
   (e) at least one clip separate from the retaining fitting and slidably fitted on to the retaining fitting in the region of the opening in the retaining fitting and positioned between an end surface of the bimetallic element and a stop shoulder on said retaining element facing the bimetallic element, for the limitation of the movement play of the bimetallic element in the elongated direction of the bimetallic element through the opening in the retaining fitting.

2. A fluid friction clutch according to claim 1, wherein the retaining fitting comprises in the region of each of the ends of the bimetallic element at least one elongated part protruding axially from the housing and wherein the clip is of U-form and is fitted axially on to the elongated part.

3. A fluid friction clutch according to claim 2, wherein the elongated part has a web form end comprises an undercut face facing axially towards the housing and the clip comprises a spring tab capable of snapping resiliently in front of the undercut face.

4. A fluid friction clutch according to claim 1 wherein the retaining fitting is formed as a shackle with a base part extending along the bimetallic element and two leg parts protruding in the region of the ends of the bimetallic element in the direction of the rotation axis, wherein from each of the ends of the bimetallic element at least one tongue protrudes in the longitudinal direction of the bimetallic element and is narrower, transversely of the longitudinal direction, than the bimetallic element, and each of the two leg parts one said insertion opening provided for the tongue in which the tongue is guided displaceably in the longitudinal direction of the bimetallic element but is fixed in the transverse direction and in the axial direction and wherein the clip is fitted on to one of the leg parts.

5. A fluid friction clutch according to claim 4, wherein at least one of the ends of the bimetallic element carries two tongues spaced from one another in the transverse direction of the bimetallic element and one of the leg parts comprises a first said insertion opening for inserting the region of the bimetallic element adjoining the two tongues, wherein from an edge of said first insertion opening axially remote from the housing a tab protrudes towards the housing and additionally divides off two transversely narrower second insertion openings for the two tongues and wherein the clip is fitted on to the tab and reaches substantially to the edge of the first insertion opening near to the housing.

6. A fluid friction clutch according to claim 1, wherein the housing carries on its side carrying the bimetallic element a plurality of axially protruding cooling fins at least some of which form said retaining elements and which extend radially outwards from a diameter circle substantially tangential to the two ends of the bimetallic element and at their radially inner ends comprise said insertion openings and form stop faces for the bimetallic element and wherein the clip is fitted on to one of the cooling fins.

7. A fluid friction clutch according to claim 6, wherein the radial depth of the insertion openings at the radially inner ends of the cooling fins is at least twice as great as the radial overlap of the ends of the bimetallic element with the cooling fins and wherein said clips are provided at both ends of the bimetallic element.

8. A fluid friction clutch according to claim 6, wherein both ends of the bimetallic element comprise an aperture which, seen in axial projection, grasps in each case around the radially inner end of at least one cooling fin in the circumferential direction of the housing, said aperture having edges opposite to one another in the circumferential direction for fixing the bimetallic element in the circumferential direction on the grasped cooling fin.

9. A fluid friction clutch according to claim 8, wherein the edges of the aperture opposite to one another in the circumferential direction are bent out of the plane of the bimetallic element.

10. A fluid friction clutch according to claim 8, wherein the clip engages in the aperture of the bimetallic element and fixes the bimetallic element in the circumferential direction of the housing.

11. A fluid friction clutch according to claim 6, wherein the axial height of the insertion openings at the radially inner ends of the cooling fins is stepped, forming radially inwardly facing stop shoulders, wherein the interval of the stop shoulders of mutually diametrically opposite cooling fins is substantially equal to the length of the bimetallic element and wherein the clips substantially cover over the axially lower part of the apertures lying radially outside the stop shoulders.

12. A fluid friction clutch according to claim 6, wherein the clip is of U-form and comprises a spring tab capable of snapping resiliently into the insetion opening at the radially inner end of the cooling fins, said tab axially fixing the clip and further abutting on a radially inwardly facing stop face of the insertion opening.

* * * * *